US007770153B2

(12) United States Patent
Chilimbi et al.

(10) Patent No.: US 7,770,153 B2
(45) Date of Patent: Aug. 3, 2010

(54) HEAP-BASED BUG IDENTIFICATION USING ANOMALY DETECTION

(75) Inventors: Trishul Chilimbi, Seattle, WA (US); Vinod Ganapathy, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 11/134,812

(22) Filed: May 20, 2005

(65) Prior Publication Data

US 2006/0265694 A1   Nov. 23, 2006

(51) Int. Cl.
G06F 9/44 (2006.01)
G06F 11/00 (2006.01)

(52) U.S. Cl. .................. 717/127; 717/130; 717/131; 714/38; 714/100

(58) Field of Classification Search ......... 717/124–136; 714/38, 100
See application file for complete search history.

(56) References Cited

U.S. PATENT DOCUMENTS

| | | | |
|---|---|---|---|
| 5,220,667 A | 6/1993 | Ichieda | |
| 5,333,311 A | 7/1994 | Whipple, II | |
| 5,713,008 A | 1/1998 | Falkner | |
| 5,740,443 A | 4/1998 | Carini | |
| 5,774,685 A | 6/1998 | Dubey | |
| 5,815,720 A | 9/1998 | Buzbee | |
| 5,909,578 A | 6/1999 | Buzbee | |
| 5,925,100 A | 7/1999 | Drewry et al. | |
| 5,940,618 A | 8/1999 | Urquhart et al. | |
| 5,950,003 A | 9/1999 | Kaneshiro et al. | |
| 5,950,007 A | 9/1999 | Nishiyama et al. | |
| 5,953,524 A | 9/1999 | Meng et al. | |
| 5,960,198 A | 9/1999 | Roediger et al. | |
| 6,026,234 A | 2/2000 | Hanson et al. | |
| 6,073,232 A | 6/2000 | Kroeker et al. | |
| 6,079,032 A | 6/2000 | Peri | |
| 6,148,437 A | 11/2000 | Shah et al. | |
| 6,216,219 B1 | 4/2001 | Cai et al. | |
| 6,233,678 B1 | 5/2001 | Bala | |
| 6,311,260 B1 | 10/2001 | Stone et al. | |
| 6,321,240 B1 | 11/2001 | Chilimbi et al. | |
| 6,330,556 B1 | 12/2001 | Chilimbi et al. | |
| 6,360,361 B1 | 3/2002 | Larus et al. | |
| 6,370,684 B1 * | 4/2002 | De Pauw et al. ............ 717/124 |

(Continued)

OTHER PUBLICATIONS

Diwan, et al., "Memory-System Performance of Programs with Intensive Heap Allocation", ACM TOCS vol. 13, Issue 3, Aug. 1995, ISSN: 0734-2071.*

(Continued)

Primary Examiner—Wei Y Zhen
Assistant Examiner—Ryan D Coyer
(74) Attorney, Agent, or Firm—Klarquist Sparkman, LLP

(57) ABSTRACT

A dynamic analysis tool uses anomaly detection to find heap-based bugs. In spite of the evolving nature of the heap, programs generally exhibit several of properties of their heap usage that remain stable. Periodically, during the execution of the program, the analysis tool computes a suite of metrics which are sensitive to the state of the heap. These metrics track heap behavior, and the stability of the heap reflects quantitatively in the values of these metrics. The ranges of stable metrics, obtained by running a program on a multiple input training set, are then treated as indicators of correct behavior, and are used in conjunction with an anomaly detector to find heap-based bugs.

20 Claims, 12 Drawing Sheets

U.S. PATENT DOCUMENTS

| | | | |
|---|---|---|---|
| 6,404,455 | B1 | 6/2002 | Ito et al. |
| 6,560,693 | B1 | 5/2003 | Puzak et al. |
| 6,571,318 | B1 | 5/2003 | Sander et al. |
| 6,598,141 | B1 * | 7/2003 | Dussud et al. ............... 711/170 |
| 6,628,835 | B1 | 9/2003 | Brill et al. |
| 6,651,243 | B1 | 11/2003 | Berry et al. |
| 6,658,652 | B1 * | 12/2003 | Alexander et al. .......... 717/128 |
| 6,675,374 | B2 | 1/2004 | Pieper et al. |
| 6,704,860 | B1 | 3/2004 | Moore |
| 6,848,029 | B2 | 1/2005 | Coldewey |
| 6,886,167 | B1 | 4/2005 | Breslau et al. |
| 6,951,015 | B2 | 9/2005 | Thompson |
| 7,032,217 | B2 | 4/2006 | Wu |
| 7,058,936 | B2 | 6/2006 | Chilimbi et al. |
| 7,140,008 | B2 | 11/2006 | Chilimbi et al. |
| 7,181,730 | B2 * | 2/2007 | Pitsianis et al. ............. 717/132 |
| 7,296,180 | B1 | 11/2007 | Waterhouse et al. |
| 7,343,598 | B2 | 3/2008 | Chilimbi et al. |
| 7,587,709 | B2 | 9/2009 | Chilimbi et al. |
| 7,607,119 | B2 | 10/2009 | Chilimbi et al. |
| 2002/0133639 | A1 | 9/2002 | Breslau et al. |
| 2002/0144245 | A1 | 10/2002 | Lueh |
| 2003/0145314 | A1 | 7/2003 | Nguyen et al. |
| 2003/0204840 | A1 | 10/2003 | Wu |
| 2004/0015897 | A1 | 1/2004 | Thompson et al. |
| 2004/0015930 | A1 | 1/2004 | Wu |
| 2004/0025145 | A1 | 2/2004 | Dawson |
| 2004/0088699 | A1 | 5/2004 | Suresh |
| 2004/0103401 | A1 | 5/2004 | Chilimbi et al. |
| 2004/0103408 | A1 | 5/2004 | Chilimbi et al. |
| 2004/0111444 | A1 | 6/2004 | Garthwaite |
| 2004/0133556 | A1 | 7/2004 | Wolczko et al. |
| 2004/0181782 | A1 * | 9/2004 | Findeisen .................... 717/130 |
| 2004/0215880 | A1 | 10/2004 | Chilimbi et al. |
| 2004/0216091 | A1 * | 10/2004 | Groeschel ................... 717/128 |
| 2005/0091645 | A1 | 4/2005 | Chilimbi et al. |
| 2005/0246696 | A1 | 11/2005 | Alexander et al. |
| 2006/0155791 | A1 | 7/2006 | Tene et al. |

OTHER PUBLICATIONS

Zhou, et al., "AccMon: Automatically Detecting Memory-related Bugs via Program Counter-based Invariants", 37th Annual IEEE/ACM International Symposium on Micro-architecture, Dec. 4, 2004.*

Balakrishnan et al., "Analyzing Memory Accesses in $\chi 86$ Binary Executables", *Proc. $13^{th}$ Intl. Conference on Compiler Construction*, LNCS 2985, pp. 5-23 (Apr. 2004).

Chilimbi et al., "Low-Overhead Memory Leak Detection Using Adaptive Statistical Profiling", *Proc. $11^{th}$ Intl. Conference on Architectural Support for Programming Language and Operating Systems (ASPLOS)*, pp. 156-164 (Oct. 2004).

Demsky et al., "Role-Based Exploration of Object-Oriented Programs", *Proceedings of $24^{th}$ International Conference on Software Engineering (ISCE)*, pp. 313-334 (May 2002).

Demsky et al., "Automatic Detection and Repair of Errors in Data Structures", *Proceedings of $18^{th}$ ACM SIGPLAN Conference on Object-Oriented Programming Systems, Language and Applications (OOPLSA)* pp. 78-95 (Oct. 2003).

Ernst, "Dynamically Discovering Likely Program Invariants", *PhD Thesis*, University of Washington, Seattle, WA (Aug. 2000).

Hangal et al., "Tracking Down Software Bugs Using Automatic Anomaly Detection", *Proceedings of $22^{nd}$ International Conference on Software Engineering (ICSE)* pp. 125-136 (Jan. 1992).

Hastings et al., "Purify: Fast Detection of Memory Leaks and Access Errors", *Winter USENIX Conference*, pp. 125-136 (Jan. 1992).

Hirzel et al., "Understanding the Connectivity of Heap Objects", *In Proceedings of International Symposium on Memory Management (ISMM)* pp. 143-156 (Jun. 2002).

Zhou et al., "AccMon: Automatically Detectin Memory-Related Bugs via Program Counter-Based Invariants", *Proceedings of $37^{th}$ International Symposium on Micro-Architecture (MICRO)* Dec. 2004.

Zorn et al., "A Memory Allocation Profiler for C and Lisp Programs," published Feb. 16, 1988, pp. 1-18.

English et al., "Loge: a self-organizing disk controller," *Proc. USENIX Winter 1992 Tech. Conf.*, San Francisco, pp. 237-251 (Jan. 1992).

Griffioen et al., "Reducing File System Latency Using a Predictive Approach," 11 pp. (no. date).

Hatfield et al., "Program Restructuring for Virtual Memory," *IBM Sys. J.*, No. 3, pp. 168-192 (1971).

Kroeger et al., "Predicting Future File-system Actions from Prior Events," *Proc. USENIX Annual Tech. Conf.*, San Diego, pp. 1-10 (Jan. 1996).

Palmer et al., "Fido: A Cache that Learns to Fetch," *Proc. 17th Int'l Conf. on Very Large Databases*, Barcelona, pp. 255-264 (Sep. 1991).

Patterson et al., "Informed Prefetching and Caching," *Proc. 15th ACM Symp. on Operating System Principles*, Copper Mountain Resort, CO, pp. 79-95 (Dec. 1995).

Staelin et al., "Smart Filesystems," *Proc. USENIX—Winter '91*, Dallas, TX, pp. 45-51 (1991).

Tait et al., "Detection and Exploitation of File Working Sets," *IEEE*, pp. 2-9 (1991).

U.S. Appl. No. 11/134,796, filed May 20, 2005, Shankar et al.

U.S. Appl. No. 11/115,924, filed Apr. 26, 2005, Chilimbi et al.

Ammons et al., "Exploiting Hardware Performance Counters with Flow and Context Sensitive Profiling", PLDI (Jun. 1997), 12 pages.

Ammons et al., "Improving Data-Flow Analysis with Path Profiles," *SIGPLAN '98* (1998), pp. 72-84.

Anderson et al., "Continuous Profiling: Where Have All the Cycles Gone?", ACM (Nov. 1997), pp. 357-390.

Annavaram et al., "Data Prefetching by Dependence Graph Precomputation", IEEE (2001), pp. 52-61.

Arnold et al., "A Framework for Reducing the Cost of Instrumented Code", *Rutgers University Technical Report DCS-TR-424* (Nov. 2000), pp. 1-10.

Bala et al., "Dynamo: A Transparent Dynamic Optimization System", ACM (2000), pp. 1-12.

Ball et al., "Efficient Path Profiling", IEEE (1996), pp. 46-57.

Berger et al., "Composing High-Performance Memory Allocators", ACM (2001), 11 pages.

Bush et al., "A Static Analyzer for Finding Dynamic Programming Errors", *Software: Practice and Experience* (2000), pp. 775-802.

Cahoon et al., "Data Flow Analysis for Software Prefetching Linked Data Structures in Java", IEEE (2001), 12 pages.

Calder et al., "Cache-Conscious Data Placement", ACM (1998), 11 pages.

Chen et al., "Reducing Memory Latency via Non-Blocking and Prefetching Caches", ACM (1992), pp. 51-61.

Chilimbi et al., "Cache-Conscious Structure Definition", *Proceedings of the ACM SIGPLAN '99* (May 1999), 12 pages.

Chilimbi et al., "Cache-Conscious Structure Layout", *Proc. ACM SIGPLAN '99 Conf. on Programming Language Design and Impl.*, (May 1999), 12 pages.

Chilimbi et al., "Dynamic Hot Data Stream Prefetching for General-Purpose Programs", ACM (2002), 11 pages.

Chilimbi, "Efficient Representations and Abstractions for Quantifying and Exploiting Data Reference Locality", ACM (2001), pp. 191-202.

Chilimbi et al., "On the Stability of Temporal Data Reference Profiles", PACT (Sep. 2001), 10 pages.

Chilimbi et al., "Using Generational Garbage Collection to Implement Cache-Conscious Data Placement", *Proceedings of the First International Symposium on Memory Management* (Oct 1998), vol. 34(3), pp. 37-48.

Cooksey et al., "A Stateless, Content-Directed Data Prefetching Mechanism", ACM (2002), pp. 279-290.

Cowan et al., "Buffer Overflows: Attacks and Defenses for the Vulnerability of the Decade", *DARPA information survivability conference and expo (DISCEX)* (2000), pp. 1-11.

Crescenzi at al., "A Compendium of NP Optimization Problems," [Downloaded from the World Wide Web on Dec. 12, 2003], 20 pages.
Dean et al., "*ProfileMe*: Hardware Support for Instruction-Level Profiling on Out-of-Order Processors", *Proc. 30th Annual Intl. Symp. On Microarchitecture* (Dec. 1997), 12 pages.
Deaver et al., "Wiggins/Redstone: An On-line Program Specializer", *Proceedings of the IEEE Hot Chips XI Conference* (Aug. 1999), 29 pages.
Dor et al., "Cleanness Checking of String Manipulations in C Programs via Integer Analysis", *Proc. 8th Int'l Static Analysis Symposium* (Jun. 2001), 19 pages.
Dor et al., "CSSV: Towards a Realistic Tool for Statically Detecting All Buffer Overflows in C", *PLDI'03* (Jun. 9-11, 2003), pp. 155-167.
Duesterwald et al., "Software profiling for hot path prediction: Less is more," *Ninth International Conference on Architectural Support for Programming Languages and Operating Systems* (Nov. 2000), pp. 202-211.
Edwards, "Black-Box Testing Using Flowgraphs: An Experimental Assessment of Effectiveness and Automation Potential", *Software Testing, Verification and Reliability*, vol. 10, No. 4 (Dec. 2000), pp. 249-262.
Eeckhout et al., "Workload Design: Selecting Representative Program-Input Pairs", *Proceedings of the 2002 International Conference on Parallel Architectures and Compilation Techniques* (2002), 12 pages.
Evans et al., "Improving Security Using Extensible Lightweight Static Analysis", *IEEE Software* (Jan./Feb. 2002), pp. 42-51.
Evans et al., "LCLint: A Tool for Using Specifications to Check Code", *SIGSOFT Symposium on the Foundations of Software Engineering* (Dec. 1994), 10 pages.
Evans et al., "Splint Manual, Version 3.1.1-1", *Secure Programming Group, University of Virginia Department of Computer Science* (Jun. 5, 2003), 121 pages.
Evans, "Static Detection of Dynamic Memory Errors", *SIGPLAN Conf. on Programming Language and Design Implementation* (May 1996), 10 pages.
Evans, "Using Specifications to Check Source Code", *TR-628, MIT Lab for Computer Science* (Jun. 1994), 97 pages.
Foster et al., "A Theory of Type Qualifiers", *Proc. ACM SIGPLAN '99 Conf. on Programming Language and Design Implementation (PLDI)* (May 1999), 12 pages.
Gloy et al., "Procedure Placement Using Temporal-Ordering Information", *ACM Transactions on Programming Languages and System*, vol. 21 (1999), pp. 111-161.
Guyer et al., "An Annotation Language for Optimizing Software Libraries", *Proc. Second Conf. on Domain Specific Languages* (Oct. 1999), 14 pages.
Halldorsson, "Approximations of Weighted Independent Set and Hereditary Subset Problems", *JGAA*, vol. 4, No. 1 (Apr. 2000), pp. 1-16.
Harris, "Dynamic Adaptive Pre-tenuring", *Proceedings of the International Symposium on Memory Management* (Oct. 2000), 9 pages.
Heil et al., "Relational Profiling: Enabling Thread-Level Parallelism in Virtual Machines", *Proc. 33rd International Symposium on Microarchitecture* (Dec. 2000), pp. 1-10.
Hirzel et al., "Bursty Tracing: A Framework for Low-Overhead Temporal Profiling", *4th ACM Workshop on Feedback-Directed and Dynamic Optimization* (Dec. 2001), pp. 1-10.
Hollingsworth et al., "MDL: A Language and Compiler for Dynamic Program Instrumentation", *Proc. Of the International Conference on Parallel Architectures and Compilations Techniques* (Nov. 1997), 12 pages.
Hölzle et al., "Reconciling Responsiveness with Performance in Purse Object-Oriented Languages", *ACM Transactions on Programming Languages and Systems* (Jul. 1996), pp. 1-40.
Horning, "The Larch Shared Language: Some Open Problems", *Compass/ADT Workshop* (Sep. 1995), 16 pages.
Joseph et al., "Prefetching Using Markov Predictors", ACM (1997), pp. 252-263.
Jouppi, "Improving Direct-Mapped Cache Performance by the Addition of a Small Fully-Associative Cache and Prefetch Buffers", IEEE (1990), pp. 364-373.
"JProfiler Manual," ejtechnologies, GmbH (2004), pp. 1-141.

Karlsson et al., "A Prefetching Technique for Irregular Accesses to Linked Data Structures", *Sixth International Symposium on High-Performance Computer Architecture* (Jan. 2000), 12 pages.
Khurshid et al., "An Analyzable Annotation Language," *OOPSLA '02* (Nov. 2002), 15 pages.
Kistler et al., "Automated Data-Member Layout of Heap Objects to Improve Memory-Hierarchy Performance," *ACM Transactions on Programming Language and Systems*, (2000), 16 pages.
Klaiber et al., "An Architecture for Software-Controlled Data Prefetching", ACM (1991), pp. 43-53.
Kramer, "Examples of Design by Contract in Java Using Contract, the Design by Contract™ Tool for Java™", *Object World Berlin '99, Design & Components* (May 17-20, 1999), 26 pages.
Larochelle et al., "Statistically Detecting Likely Buffer Overflow Vulnerabilities", *2001 USENIX Security Symposium* (Aug. 2001), 5 pages.
Larus, "Whole Program Paths," *SIGPLAN '99 Conference on Programming Languages and Design* (1999), 11 pages.
Leavens et al., "Enhancing the Pre-and Postcondition Technique for More Expressive Specifications", *Proc. World Congress on Formal Methods in the Development of Computing Systems* (Sep. 1999), 21 pages.
Leavens et al., "Preliminary Design of JML", *Technical Report 98-06v, Iowa State University Department of Computer Science* (Jun. 1998-2003; revised May 2003), 94 pages.
Leino, "Checking Correctness Properties of Object-Oriented Programs," *Internet*, http://research.microsoft.com/leino/paper/1 (Aug. 19, 2002), 49 pages.
Luk et al., "Complier-Based Prefetching for Recursive Data Structures", ACM (1996), pp. 222-233.
Melski et al., "Interprocedural Path Profiling", *University of Wisconsin* (1998), pp. 1-50.
Microsoft Corporation, "Scalable Program Analysis", *Internet*, http://research.microsoft.com/spa/ (downloaded on Sep. 5, 2003), 3 pages.
Mowry et al., "Design and Evaluation of a Compiler Algorithm for Prefetching", ACM (1992), pp. 62-73.
Mowry et al., "Predicting Data Cache Misses in Non-Numeric Applications Through Correlation Profiling", *International Symposium on Microarchitecture* (1997), 7 pages.
Nevill-Manning et al., "Identifying Hierarchical Structure in Sequences: A Linear-time Algorithm", *Journal of Artificial Intelligence Research* (1997), 7:67-82.
Petrank et al., "The Hardness of Cache Conscious Data Placement," *29th Annual ACM Symposium on Principles of Programming Languages* (2002), 33 pages.
Roth et al., "Dependence Based Prefetching for Linked Data Structures", *Proceedings of the 8th International Conference on Architectural Support* (Oct. 1998), pp. 115-126.
Roth et al., "Effective Jump-Pointer Prefetching for Linked Data Structures", IEEE (1999), pp. 111-121.
Rubin et al., "An Efficient Profile-Analysis Framework for Data-Layout Optimizations", *POPL* (Jan. 2002), pp. 140-153.
Saavedra et al., "Improving the Effectiveness of Software Prefetching With Adaptive Execution", *IEEE* (1996), pp. 68-78.
Sastry et al., "Rapid Profiling Via Stratified Sampling", *International Symposium on Computer Architecture* (2001), pp. 1-12.
Savage et al., "Eraser: a dynamic data race detector for multithreaded programs", *ACM Transactions on Computer Systems (TOCS)* (1997), 391-411.
Seidl et al., "Segregating Heap Objects by Reference Behavior and Lifetime", *8th Int'l Conf. on Architectural Support for Programming Languages and Operating Systems* (Oct. 1998), 12 pages.
Shaham, "Automatic Removal of Array Memory Leaks in Java", (1999), 12 pages.
Srivastava, "ATOM: A System for Building Customized Program Analysis Tools", *SIGPLAN '94 Conf. on Programming Language Design and Impl.* (1994), 25 pages.
Srivastava et al., "Vulcan Binary Transformation in a Distributed Environment", *Microsoft Research*, MSR-TR-99-76 (Apr. 20, 2001), pp. 1-12.

Stoutchinin et al., "Speculative Prefetching of Induction Pointers", *Proceedings of 10th International Conference on Compiler Construction* (2001), 15 pages.

"Technologies for Measuring Software Performance", *Intel Corporation* (2003), 4 pages.

Traub et al., "Ephemeral instrumentation for lightweight program profiling", *Technical report*, Harvard University (2000), pp. 1-13.

Truong et al., "Improving Cache Behavior of Dynamically Allocated Data Structures", *PACT* (1998), 8 pages.

Vanderwiel et al., "Data Prefetch Mechanisms", *ACM Computing Surveys*, vol. 32, No. 2 (Jun. 2000), pp. 174-199.

Wahls et al., "The Direct Execution of SPECS-C++: A Model-Based Specification Language for C++ Classes", *Technical Report TR94-02b, Iowa State University Department of Computer Science* (Nov. 18, 1994), 52 pages.

Zilles et al., "A Programmable Co-processor for Profiling", *Proceedings of the 7th International Symposium on High Performance Architecture* (Jan. 2001), 12 pages.

Cifuentes, "Structuring Decompiled Graphs," Technical Report 5/94, Faculty of Information Technology, Queensland University of Technology, GPO Box 2434, Brisbane 4001, Australia (Apr. 1994), 15 pages.

Hauck, "Configuration Prefetch for Single Context Reconfigurable Coprocessors," In Proceedings of the ACM/SIGDA International Symposium on Field Programmable Gate Arrays (Feb. 1998), pp. 65-74.

Ung et al., "Optimising Hot Paths in a Dynamic Binary Translator," In Workshop on Binary Translation, Oct. 2000, pp. 55-65.

Chilimbi et al., "HeapMD: Identifying Heap-based Bugs Using Anomaly Detection," ACM (2006) 10 pages.

Gonzalez et al., "Eliminating Cache Conflict Misses Through XOR-Based Placed Functions," ACM (1997) pp. 76-83.

\* cited by examiner

Figure 5

|        | Average | Std. Dev. |
|--------|---------|-----------|
| gzip   | 0.00%   | 0.01%     |
| crafty | 0.00%   | 0.02%     |
| mcf    | 0.34%   | 9.01%     |
| parser | -0.17%  | 1.72%     |
| twolf  | -0.03%  | 1.10%     |
| vpr    | -0.04%  | 0.14%     |
| gcc    | -0.47%  | 1.74%     |
| vortex | -0.01%  | 0.22%     |

Figure 8

| Indegree=Outdegree | Input 1 | Input 2 |
|---|---|---|
| Average | 2.10% | -0.29% |
| Standard Deviation | 24.38% | 4.61% |
|  |  |  |
| Outdegree=2 | Input 1 | Input 2 |
| Average | -0.22% | -0.15% |
| Standard Deviation | 2.44% | 0.63% |

Figure 9
```
(1)struct s_linked_vptr *insert_in_vptr_list
(2) (struct s_linked_vptr *head, void *vptr_to_add) {
(3)   struct s_linked_vptr *linked_vptr;
(4)   linked_vptr = (struct s_linked_vptr *)
(5)   my_malloc (sizeof(struct s_linked_vptr));
(6)//linked_vptr->data_vptr = vptr_to_add; /* Bug! */
(7)   linked_vptr->next = head;
(8)   return (linked_vptr);
(9)}
```
Figure 10
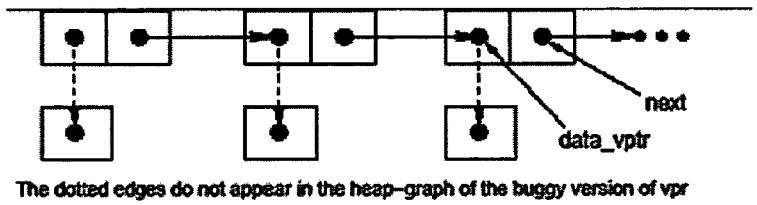
The dotted edges do not appear in the heap-graph of the buggy version of vpr
Figure 11
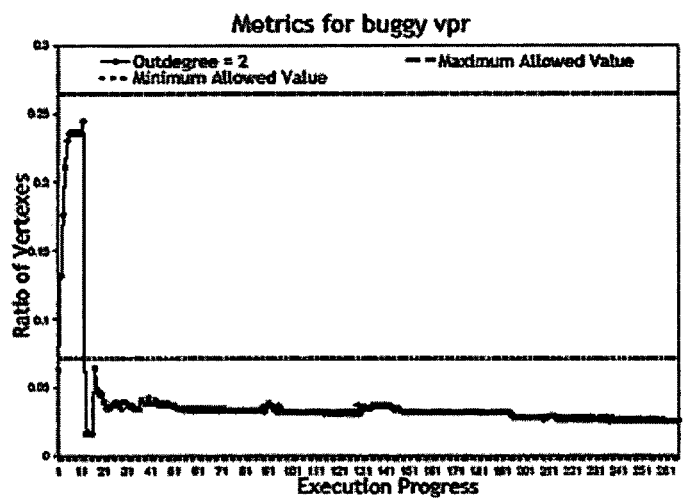

Figure 12

| Metric | Normal Range | Violation? |
|---|---|---|
| SCCs: Mean size | [1, 2.53] | no |
| SCCs: Median size | [1,1] | no |
| SCCs: Mode size | [1,1] | no |
| Indegree=1 | [0.073, 0.991] | no |
| Outdegree=0 | [0.217, 0.445] | yes |
| Outdegree=1 | [0.047, 0.214] | yes |
| Outdegree=2 | [0.071, 0.264] | yes |

Figure 16

| Metric | Normal Range | Violation? |
|---|---|---|
| SCCs: Median size | [1,1] | no |
| SCCs: Mode size | [1,1] | no |
| Indegree=1 | [0.650, 0.910] | no |
| Outdegree=1 | [0.281, 0.361] | yes |
| Outdegree=2 | [0.324, 0.352] | yes |

Figure 21

| Metric | Normal Range | Bug1 Violation? | Bug2 Violation? |
|---|---|---|---|
| SCCs: Mean size | [1, 1.047] | no | no |
| SCCs: Median size | [1,1] | no | no |
| SCCs: Mode size | [1,1] | no | no |
| Indegree=1 | [0.388, 0.682] | yes | no |
| Outdegree=1 | [0.148, 0.412] | yes | no |
| Outdegree=2 | [0.035, 0.236] | yes | no |
| #Edges/#Vertices | [1.849, 4.644] | yes | no |
| Ptr_One | [0.424, 0.763] | no | no |
| One | [0.635, 0.837] | no | no |

Figure 13
```
(1) sortpin() {
(2) ...
(3)   xpptr = (TEBOXPTR *)
(4)   safe_malloc(300 * sizeof(TEBOXPTR));
(5)   /* Several lines of code omitted for brevity */
(6)   for (j = 1; j <= n ; j++) {
(7) //   xpptr[j]->nextterm = xpptr[j+1]; /* Bug! */
(8)   }
(9) }
```
Figure 14
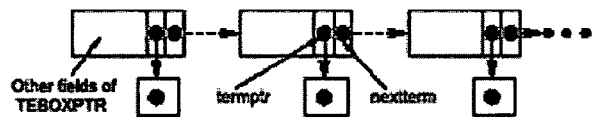
Figure 15
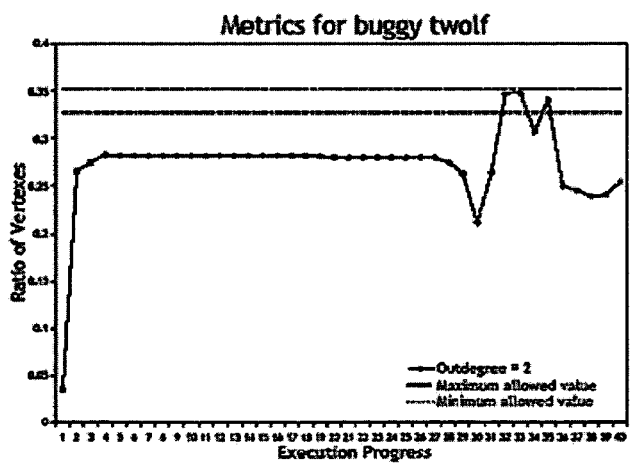

Figure 17

```
(1) boolean Tree_AddInto (...) {
(2) /* Several lines omitted for brevity */
(3) /* Create a new Leaf Node (Sibling) */
(4) if (Tree_CreateNode (...)) {
(5)// SibNode->ParentNode = LeafNode->ParentNode;
(6) /* Bug! */
(7) ...}
(8) }
```

Figure 18

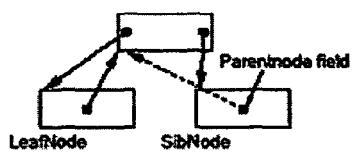

Figure 19

```
(1) boolean Tree_PromoteInternalNode (...) {
(2) /* Several lines omitted for brevity */
(3)// for (Pos = 0; Pos < SetHead->MinKeys; ++Pos) {
(4) for (Pos = 0; Pos < SetHead->MinKeys-1; ++Pos) {
(5) ParentNode->NodeKeys[Pos]
= SetHead->TempKeys[Pos];
(6) ParentNode->NodeHandles[Pos]
= SetHead->TempHandles[Pos];
(7) ParentNode->NodeLeafs[Pos+1]
= SetHead->TempLeafs[Pos+1];
(8) }
(9) ...}
```

Figure 20

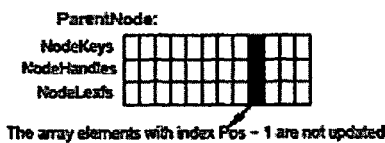

HEAP-BASED BUG IDENTIFICATION USING ANOMALY DETECTION

TECHNICAL FIELD

The field relates to dynamic program analysis, and tools therefor.

BACKGROUND

As defined by Microsoft® Computer Dictionary, Fourth Edition, Microsoft Press (1999), the heap is a portion of memory in a computer that is reserved for a program to use for the temporary storage of data structures whose existence or size cannot be determined until the program is running. To build and use such elements, programming languages such as C and Pascal include functions and procedures for requesting free memory from the heap, accessing it, and freeing it when it is no longer needed. In contrast to stack memory, heap memory blocks are not freed in reverse of the order in which they were allocated, so free blocks may be interspersed with blocks that are in use. As the program continues running, the blocks may have to be moved around so that small free blocks can be merged together into larger ones to meet the program's needs.

Modern software packages allocate and manage a vast amount of information on the heap. Object oriented languages such as Java and C# almost exclusively use the heap to represent and manipulate complex data structures. The growing importance of the heap necessitates detection and elimination of heap-based bugs. These bugs often manifest themselves in different forms, such as dangling pointers, memory leaks, and inconsistent data structures.

Unfortunately, heap-based bugs are hard to detect. The effect of these bugs is often delayed, and may be apparent only after significant damage has been done to the heap. In some cases, the effect of the bug may not be apparent. For instance, a dangling pointer bug does not crash the program unless the pointer in question is dereferenced, and on occasion, may not cause a crash even then. Consequently, software testing is not very effective at identifying heap-based bugs. Because of the non-deterministic nature of heap-based bugs, even if the buggy statement is executed on a test run, it is not always guaranteed to crash the program, or produce unexpected results. Moreover, the effect of heap-based bugs is often delayed, as a result of which testing does not reveal the root-cause of the bug.

Static analysis techniques, such as shape analysis (see, e.g., M. Sagiv, T. W. Reps, and R. Wilhelm, "Parametric Shape Analysis Via 3-Valued Logic," *ACM Trans. Prog. Lang. Syst.* (*TOPLAS*), 24(3):217-298, May 2002), overcome these limitations. They examine all valid code paths, and can also provide soundness guarantees about the results of the analysis. Shape analysis has enjoyed success at determining the correctness of, or finding bugs in algorithms that manipulate heap data structures. However, in spite of recent advances (such as described by B. Hackett and R. Rugina, "Region-Based Shape Analysis With Tracked Locations," *Proc. 32nd Symp. on Princ. of Prog. Lang.* (*POPL*), January 2005; and E. Yahav and G. Ramalingam, "Verifying Safety Properties Using Separation And Heterogeneous Abstractions," *Proc. ACM SIGPLAN Conf. On Prog. Lang. Design and Impl.*, pages 25-34, June 2004), shape analysis algorithms are expensive, and apply only to limited classes of data structures, and properties to be checked on them. Moreover, the results of static analysis, while sound, are often overly conservative, and over approximate the possible set of heap configurations.

On the other hand, dynamic analysis techniques have the advantage of precisely capturing the set of heap configurations that arise. Several dynamic analysis tools have been developed to detect special classes of heap-based bugs. (See, e.g., T. M. Chilimbi and M. Hauswirth, "Low-Overhead Memory Leak Detection Using Adaptive Statistical Profiling," *Proc. 11th Intl. Conf. on Arch. Support for Prog. Lang. and Op. Sys.* (*ASPLOS*), pages 156-164, October 2004; B. Demsky and M. Rinard, "Automatic Detection And Repair Of Errors In Data Structures," *Proc. 18th ACM SIGPLAN Conf. on Object-Oriented Prog., Systems, Lang. and Appls.* (*OOPSLA*), pages 78-95, October 2003; R. Hastings and B. Joyce, "Purify: Fast Detection Of Memory Leaks And Access Errors," *Winter USENIX Conference*, pages 125-136, January 1992; and N. Nethercote and J. Seward, "Valgrind: A Program Supervision Framework," *Elec. Notes in Theor. Comp. Sci.* (*ENTCS*), 89(2), 2003.) However, there has been relatively little research at understanding the runtime behavior of the heap, and applying this information for bug finding.

SUMMARY

The following description details various techniques and tools for analyzing heap behavior of a program, and finding heap-related bugs. An exemplary implementation of a runtime tool constructs and summarizes heap behavior, and uses anomaly detection to find heap-based bugs. The tool analyzes heap behavior during execution of a program to identify relatively stable properties. The tool then detects the occurrence of anomalies deviating from the observed properties, which may lead to finding bugs.

More particularly, the exemplary implementation of the runtime tool discovers stable properties of the heap-graph, which is a directed graph with objects on the heap as vertexes. An edge is drawn from vertex u to vertex v if the object corresponding to u points to the object corresponding to v.

The runtime tool further computes a suite of metrics, such as the size and number of connected components, the ratio of vertexes with in-degree=out-degree, and the ratio of leaves and roots, which are sensitive to the structure of the heap-graph. It computes these metrics periodically as the program executes, thus capturing the evolving nature of the heap-graph. A key hypothesis of this technique is that in spite of the evolving nature of the heap, several properties of the heap-graph remain relatively stable. Experimental results using several benchmarks empirically show that this hypothesis holds in practice. The intuition behind this is that programmers implicitly maintain several invariants over heap properties to manage the complexity of the heap, which, unlike code, has no tangible, programmer-visible representations. The stability of the heap-graph is reflected quantitatively in the values of the metrics, several of which remain stable as well. These metrics serve as a "signature" of the heap behavior of a program, and their range determines the set of values that arise during normal execution of the program.

The runtime tool uses these metrics with an anomaly detector to find bugs. Metrics computed over an execution of the program are compared against the normal range; if a metric goes out of range, it is an indication that something is wrong. The runtime tool does not require a formal specification of correct behavior to be specified by the programmer in advance; the tool automatically mines stable properties of the heap, and uses these as specifications of correct behavior.

BRIEF DESCRIPTION OF THE DRAWINGS

FIG. 5 is a table of average and standard deviation for the rates of change of the ratio of pointer-valued heap locations that store NULL and non-NULL constant values.

FIG. 8 is a table of average and standard deviation for the distributions in FIG. 7.

FIG. 9 is a source code listing of a portion of a benchmark program having an injected bug.

FIG. 10 is a heap-graph produced by the analysis tool of FIG. 1 for an execution of the buggy benchmark program of FIG. 9.

FIG. 11 is a graph of several globally stable metrics identified by the analysis tool of FIG. 1 for the execution of the buggy benchmark program of FIG. 9.

FIG. 12 is a table of the globally stable metrics, their normal range and anomaly detected information generated by the analysis tool of FIG. 1 for the execution of the buggy benchmark program of FIG. 9.

FIG. 13 is a source code listing of a portion of a benchmark program having an injected bug.

FIG. 14 is a heap-graph produced by the analysis tool of FIG. 1 for an execution of the buggy benchmark program of FIG. 13.

FIG. 15 is a graph of globally stable metrics identified by the analysis tool of FIG. 1 for the execution of the buggy benchmark program of FIG. 13.

FIG. 16 is a table of the globally stable metrics, their normal range and anomaly detected information generated by the analysis tool of FIG. 1 for the execution of the buggy benchmark program of FIG. 13.

FIG. 17 is a source code listing of a portion of a benchmark program having an injected bug.

FIG. 18 is a heap-graph produced by the analysis tool of FIG. 1 for an execution of the buggy benchmark program of FIG. 17.

FIG. 19 is a source code listing of a portion of a benchmark program having an injected bug.

FIG. 20 is a heap-graph produced by the analysis tool of FIG. 1 for an execution of the buggy benchmark program of FIG. 19.

FIG. 21 is a table of globally stable metrics, their normal range and anomaly detected information generated by the analysis tool of FIG. 1 for the execution of the buggy benchmark programs of FIGS. 17 and 19.

DETAILED DESCRIPTION

Figure 1:
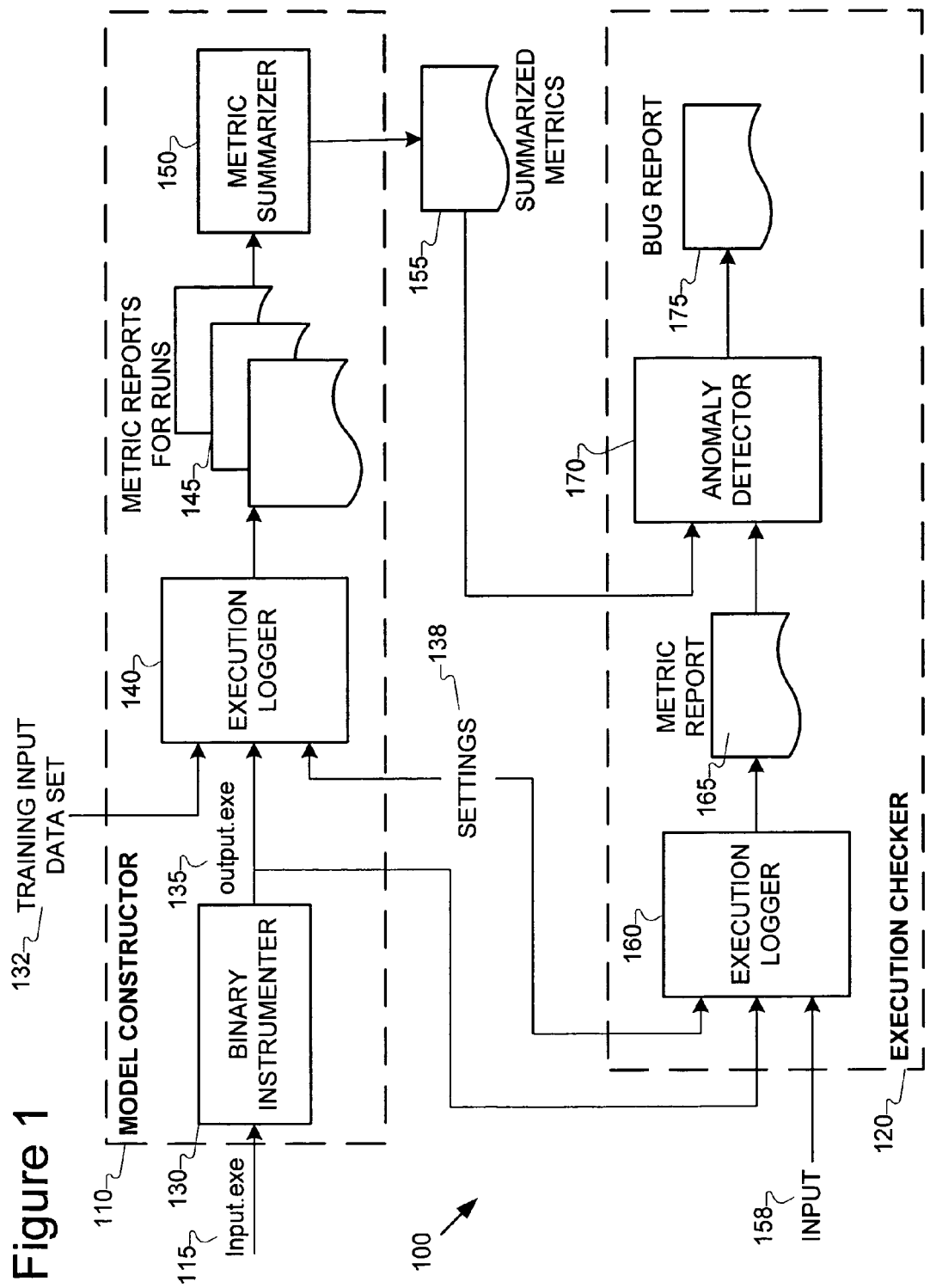
FIG. 1 is a data flow diagram of a software analysis tool utilizing anomaly detection to identify heap-based bugs in a computer program.

The following description is directed to techniques for identifying heap-based bugs in a program using anomaly detection. More particularly, an exemplary implementation of a runtime tool described herein models evolving heap behavior to discover stable heap properties for a program. The runtime tool then detects anomalous behavior of the program that deviates from these observed stable properties, so as to aid in finding heap-based bugs.

1. Overview of Runtime Tool For Heap-based Bug Identification Using Anomaly Detection With reference to FIG. 1, an exemplary software analysis tool 100 for heap-based bug identification using anomaly detection employs a two-phase design. The first phase, a model constructor 110, builds a model of expected program behavior. The second phase, an execution checker 120, compares execution traces of the program against the model, and raises an alarm if a trace deviates from the model.

The tool 100 can be designed to operate in various ways, based upon the interaction of the two phases discussed above:

1. A first design, typically meant for long-running programs, uses the model constructor and execution checker simultaneously. It builds a model of the program using the model constructor 110 as the program executes on an input, and uses the execution checker 120 to verify the current state of the program against the model built so far. Thus, the model evolves as execution proceeds. It learns stable ranges of heap properties, and checks that the heap properties at any point during the execution remains within this expected stable range. If it detects a violation, it raises an alarm, and refines the model to accommodate the case that caused the violation.

2. In a second design, the model constructor 110 first builds a model of the program's behavior (e.g., during a trial or reference execution of the program). This model is then used to check subsequent execution of the program in an online fashion. That is, the execution of the program is continuously monitored against the model, and an alarm is raised if the execution violates the model.

3. The third design, typically meant for post-mortem analysis, compares an execution trace in an offline fashion against a model of the program's behavior, and detects locations in the execution trace where the model was violated. This design offers the advantage of having the entire execution trace for analysis against the model. The implementation of the tool used for the experimental results described below employs this design. As demonstrated in the results discussed below, offline analysis of execution traces produced by this tool can be used to identify the first instance of an anomaly, and hence be used to localize the root-cause of the bug. The offline analysis can also use the information available in the entire trace, thus potentially reducing the "cascade-effect", where a single mistake in the analysis leads to a large number of false positives.

In alternative implementations, the tool may be modified to accommodate the first or the second design using sampling techniques, such as those described by T. M. Chilimbi and M. Hauswirth, "Low-Overhead Memory Leak Detection Using Adaptive Statistical Profiling," *Proc. 11th Intl. Conf. on Arch. Support for Prog. Lang. and Op. Sys. (ASPLOS)*, pages 156-164, October 2004; and B. Liblit, A. Aiken, A. X. Zheng, and M. I. Jordan, "Bug Isolation Via Remote Program Sampling,"

*Proc. ACM SIGPLAN Conf. on Prog. Lang. Design and Impl. (PLDI)*, pages 141-154, June 2003.

1.1 Building Models of Heap Behavior

The model constructor 110 computes a suite of metrics on the heap-graph at several points during the execution of the program. The metrics computed by the model constructor 110 are sensitive to the properties of the heap-graph; consequently, changes to the heap-graph manifest as changes in the values of metrics. The model constructor 110 uses values of metrics gathered over executions of the program on a training set 132, and identifies the normal range of a subset of these metrics. The execution checker 120 identifies runs of the program in which metrics violate the normal range, and marks them as erroneous.

There are several challenges to appropriately modeling heap behavior that are addressed in an exemplary implementation of the model constructor 110, including the following.

1. Evolving nature of the heap. As a program runs, it allocates and deallocates memory from the heap. Consequently, the number of objects on the heap, as well as the connectivity of these objects differs at different program points. Accordingly, the model of the heap desirably captures the heap's evolving nature.

In one implementation of the tool 100 described below, the metrics computed by the model constructor 110, such as the number and mean size of connected components, degree of vertexes and ratio of leaves and roots, are sensitive to the structure of the heap-graph. Because the model constructor 110 computes these metrics periodically at several points during the program's execution, it captures the evolving nature of the heap-graph.

2. Sensitivity to the inputs of the program. Different inputs to the program may induce different heap configurations. Consequently, several heap configurations are possible at a single point of the program. Accordingly, the model of the heap desirably summarizes heap configurations that can arise at a particular program point.

Because the below described implementation of the model constructor 110 constructs models using metric reports from runs of the program on inputs drawn from a training set, it models sensitivity of the program to its inputs.

3. Size of the heap. Heap-intensive programs create a large number of objects on the heap. Given that several heap configurations can arise at a program point based upon the input to the program, a model that stores all the con-figurations of the heap at each program point can become impractical, especially for heap-intensive programs. Firstly, it is challenging to construct and represent such a model in a scalable way. Secondly, the execution checker 120, which compares an actual execution trace against this model, also has to work efficiently and scalably to handle such programs. Hence, the model constructor preferably provides a succinct and scalable summarization of heap configurations.

The exemplary implementation of the model constructor 110 described below does not store the exact set of configurations of the heap-graph that can arise at each program-point. The metrics it computes, which are sensitive to the heap-graph's properties, serve as a succinct summary of possible heap-graph configurations.

4. Sensitivity of the models. A model that captures only a subset of the possible heap configurations that arise at a program point is an under approximation. Because the tool 100 infers the heap configurations that can arise by executing the program on inputs from a training set, the model constructed is necessarily an under approximation. An under approximation will identify all execution traces that result in erroneous heap configurations at a program point. However, legitimate heap configurations could still be marked erroneous, thus resulting in false-positives.

On the other hand, a model that over approximates the possible set of heap configurations captures a superset of the possible heap configurations at each program point. While such a model will never report a false-positive, it could allow execution traces that result in buggy heap configurations, thus resulting in false negatives (i.e., missed bugs).

As discussed later, the model constructed in the exemplary implementation of the tool 100 neither under approximates nor over approximates the set of heap configurations. Consequently, the execution checker 120 can produce both false-positives and false-negatives. With program analysis tools that find bugs, false-positives are generally considered a bigger problem than false-negatives, because a large number of false-positives overwhelm the user of the tool. The model constructed by the model constructor 110 consolidates several metric reports, and identifies the normal range of "stable" metrics. The tool 100 can miss bugs because a buggy execution can still produce metric values within the normal range. However, we have observed that violation of the normal range of metrics correlate closely to real bugs, thus the tool produces few false-positives.

In the exemplary implementation, the metrics computed by the tool's model constructor 110 can be broadly divided into three categories (Table 1 shows the list of metrics computed in this exemplary implementation), although the architecture of the model constructor allows other metrics to be easily added in the future. Each metric described in Table 1 is computed at several program points during the run of the program on each input from a training set.

TABLE 1

| Metrics Computed by Tool. | |
|---|---|
| Classification | Metrics |
| Connectivity-based | (a) Mean, (b) Median, and (c) Mode sizes of, and (d) number of connected and strongly connected components. |
| Degree-based | Ratio of vertexes in the heap-graph with: (a) outdegree = 0 (leaves), (b) outdegree = 1, (c) outdegree = 2, (d) indegree = 0 (roots), (e) indegree = 1, and (f) indegree = outdegree, and the ratio of edges to vertices in the heap-graph. |
| Value-based | Ratio of heap locations, both pointer-valued and otherwise, that, during their lifetime, store: (a) only the value zero (NULL), (b) a constant non-zero value, (c) two non-zero values, and (d) many non-zero values. |

Ideally, the tool 100 would compute the metrics each time the heap-graph changes because of addition or deletion of vertexes, or addition, deletion or modification of edges. However, doing so would lead to an unacceptable performance penalty because the metrics have to be recomputed potentially after every program statement that modifies the heap. Consequently, the model constructor 110 computes metrics periodically at certain pre-defined program points, called metric computation points. In the exemplary implementation of the tool 100, these are function entry-points and function exits. As the program executes, metrics are computed once for every frq metric computation points encountered, where frq is a user-specified frequency.

The model constructed by the tool 100 is neither an under approximation nor an over approximation of the heap's behavior. For each input from the training set 132, the model constructor computes a suite of metrics on the heap-graph at several program points. The use of metrics only captures certain properties of the heap-graph, and hence results in loss of information because the heap-graph cannot be reconstructed uniquely using the metrics observed. Thus, the suite of metrics for each run is an over approximation of the set of possible configurations of the heap-graph. On the other hand, because the tool uses inputs from a training set, it observes a subset of the possible set of heap configurations. Hence, a model constructed by computing metrics on the heap configurations that arise on inputs from a training set neither under approximates nor over approximates the set of correct configurations.

1.2 Implementation of the Analysis Tool

FIG. 1 shows the architecture of the analysis tool 100. The model constructor 110 has three main components: a binary instrumenter 130, an execution logger 140, and a metric summarizer 150.

The binary instrumenter 130 processes the executable of the program being analyzed (e.g., "input.exe" 115) and adds instrumentation that exposes the addition, modification and removal of objects in the heap to the execution logger. It 130 instruments allocator and deallocator functions, such as malloc, realloc and free, to record the addresses and the sizes of objects allocated on the heap. In addition, the binary instrumenter 130 also instruments instructions which write to objects on the heap. Each write instruction is instrumented to record the address of the object being written to, and the value written to that address. In an exemplary implementation of the tool 100, the binary instrumenter 130 is built using a binary transformation tool, such as Vulcan (described by A. Edwards, A. Srivastava, and H. Vo, "Vulcan: Binary transformation in a distributed environment," Technical Report 2001-50, Microsoft Research, April 2001). In alternative implementations, the analysis tool 100 can employ other instrumenters, including instrumentation tools that process the source files of the program to add instrumentation instructions.

The execution logger 140 runs the instrumented file (e.g., "output.exe" 135) on inputs from a training set 132. It maintains an image of the heap-graph, and updates this image when output.exe allocates, frees, or writes to an object represented in the heap-graph. As mentioned earlier, it computes metrics on the heap-graph at a user-specified frequency (called "frq"), which is specified in a settings file 138.

Alternatively, it is also possible to compute the metrics directly on the heap, which would obviate the need to maintain an image of the heap-graph within the execution logger. The approach of maintaining an image of the heap-graph was chosen in the exemplary implementation of the analysis tool 100 for two reasons:

1. Algorithms that compute connected component metrics, strongly connected component metrics, and value-based metrics are only sensitive to the connectivity of objects on the heap. Traversing the heap periodically to compute metrics can result in poor cache-locality translating to performance penalty. By maintaining an image of the heap-graph that only stores connectivity information between objects on the heap, the analysis tool 100 can compute the required metrics while still preserving cache-locality.

2. The approach permits modular reasoning about the heap behavior of interacting programs. For instance, one could study the heap behavior of a library by instrumenting the library alone. As the library gets invoked by several programs, the heap-graph produced by the execution logger corresponds to the heap behavior of the library. Consequently, one can identify heap-based bugs in the library without having to instrument all the programs that invoke the library.

Figure 2:
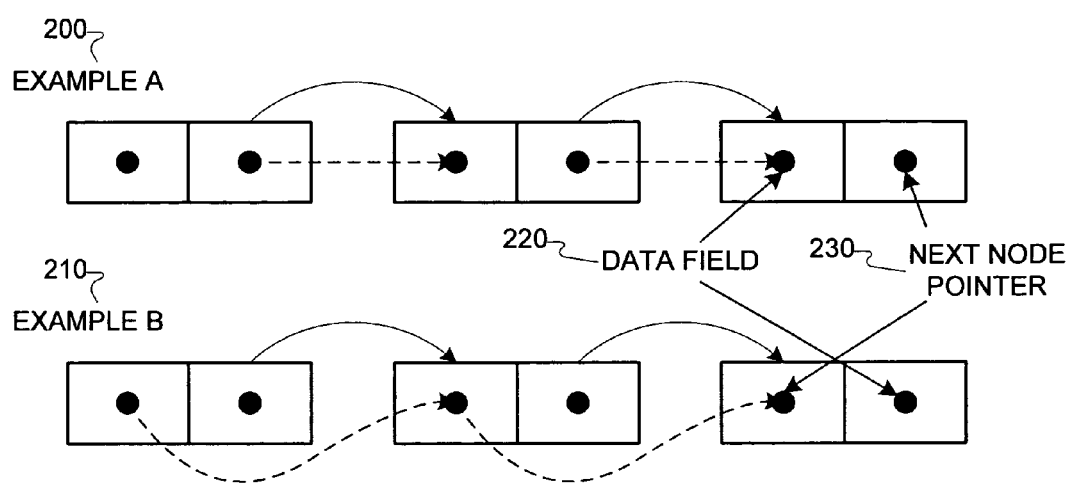
FIG. 2 is a diagram illustrating two examples of a heap-graph constructed by the tool of FIG. 1 to model heap behavior of a program.

The execution logger 140 can construct the heap-graph at any of several levels of granularity. For instance, Example 1 in FIG. 2 shows three nodes of a linked-list. Each node of the linked-list contains two fields: a data member, and a pointer to the next node. If the heap-graph is constructed at the granularity of individual fields, as shown by the dotted lines, it has six vertexes and two edges. On the other hand, if it is constructed at the granularity of objects, as shown by the bold lines, it has three vertexes and two edges.

Constructing the heap-graph at the granularity of fields captures fine-grained information, such as the connectivity of individual fields. However, the metrics computed on such a graph will be sensitive to the layout of fields within an object. For instance, consider the heap-graph (constructed at field-granularity) of a k-node linked-list. With a field layout similar to Example A shown in FIG. 2, only two vertexes have indegree=outdegree (equal to 0), namely, the vertexes corresponding to the data-field of the left-most node, and the next-node-field of the right-most node of the linked-list. However, with a field layout similar to Example B in FIG. 2, all but two vertexes have indegree=outdegree, namely the vertexes corresponding to the next-node-fields of the leftmost node and the right-most node of the linked list. With this layout, all the vertexes corresponding to the data-fields have indegree=outdegree=0, and all but two of the next-node-fields of the linked-list have indegree=outdegree=1. On the other hand, all metrics are the same if heap-graphs are constructed at object granularity. For this reason, the exemplary implementation of the analysis tool 100 constructs the heap-graph at object granularity.

The metric summarizer 150 consolidates metric reports 145 obtained from individual executions of the instrumented program (e.g., "output.exe" 135) on inputs from a training set 132. The summarized metrics can be classified into three categories based upon their stability across runs of a program:

1. A metric may remain relatively constant during the execution of the program for each input from the training set, perhaps acquiring a different constant value in each run. The range of such a globally stable metric can be used as an indicator of correct behavior, and executions which result in the metric going out of range can be marked as potentially buggy.

2. As observed by several researchers, programs execute in phases, and different phases of the program exhibit different heap behavior. As the program phase changes, the heap-graph, and consequently some metrics associated with the heap-graph change to reflect the new heap behavior of the program. A locally stable metric acquires different values across phases of the program, but remains relatively constant within a program phase. Note that globally stable metrics are also locally stable.

3. An unstable metric is neither globally stable nor locally stable.

The key observation used by the analysis tool 100 is that in spite of the phase behavior of the program, several stable metrics exist. In our experience, metrics change rapidly during program startup and shutdown. We observed that during the other phases of the program, while some metrics change to reflect the phase behavior of the program, there are several metrics which remain relatively stable. In the section entitled "Existence of Stable Metrics" below, we provide empirical evidence that stable metrics exist.

The analysis tool 100 uses this observation. In the exemplary implementation, the summarizer 150 identifies metrics which remain globally stable when the startup and shutdown of the program are ignored. Because a globally stable metric does not change, or changes slowly, its average rate of change will be close to zero. The summarizer compares the rate of change of each metric against a threshold value, and identifies slowly changing metrics as globally stable. The summarized metric report, which serves as a model for the execution checker, contains the range of values observed for these metrics over the runs of the program on the training input set. In alternative implementations, the summarizer 150 can also include locally stable metrics in the model.

1.3 Checking Execution Traces to Detect Bugs

The second phase of the analysis tool 100, the execution checker 120, uses the model constructed by the first phase to monitor executions of the program, and identify anomalies, which are potentially because of heap-related bugs. The lower half of FIG. 1 shows the architecture of the analysis tool's execution checker 120. As with the model constructor 110, the execution logger 160 executes the instrumented program (e.g., "output.exe" 135), and produces a metric report 165. This report is analyzed by the anomaly detector 170, which identifies deviations from the model.

The anomaly detector 170 uses the summarized metric report 155 (from the model constructor), which serves as the model, as a basis for comparing metric reports obtained from executions of the program on other inputs. The summarized metric report 155 contains ranges of globally stable metrics. The execution checker 120 verifies that the values of these metrics obtained in the current execution are within the permitted range.

As discussed earlier, the exemplary implementation of the analysis tool is constructed as a post-mortem analysis tool, where metrics are analyzed after the execution of the program has completed. The design of the execution checker 120 can be readily adapted to other designs as well. Because the execution checker in the exemplary implementation only performs a light-weight comparison to verify that a metric is in its allowed range, the execution checker can be modified to work in an online fashion as well.

In other implementations of the analysis tool, the execution checker can be extended to also perform comparison of locally stable metrics as well. In one such alternative implementation, the execution checker compares the values of the locally stable metrics from corresponding phases in the program. This technique requires identification of corresponding program phases, such as by applying program phase detection and prediction techniques described by C. Ding and Y. Zhong, "Predicting Whole-Program Locality With Reuse Distance Analysis," *Proc. ACM SIGPLAN Conf on Prog. Lang. Design and Impl.* (*PLDI*), pages 245-257, June 2003; X. Shen, Y. Zhong, and C. Ding, "Locality phase prediction," *Proc. 11th Intl. Conf. on Arch. Support for Prog. Lang. and Op. Sys.* (*ASPLOS*), pages 165-176, October 2004; T. Sherwood, E. Perelman, G. Hamerly, and B. Calder, "Automatically characterizing large scale program behaviour," *Proc. 10th Intl. Conf on Arch. Support for Prog. Lang. and Op. Sys.* (*ASPLOS*), pages 45-57, October 2002; and T. Sherwood, S. Sair, and B. Calder, "Phase tracking and prediction," *Proc. 30th Intl. Symp. on Computer Architecture* (*ISCA*), pages 336-347, June 2003.

2. Existence of Stable Metrics

In this section, we present empirical evidence that stable metrics exist. Several metrics computed on the heap-graph, especially connectivity and degree-based metrics, are sensitive to its structure. Thus, a structurally stable heap-graph provides indirect evidence that stable metrics exist. In addition, value-based metrics, are sensitive to the number of distinct values stored at heap locations.

To study stability, we measured the number of distinct values stored in each heap location. If a large fraction of heap locations are mutated only once, i.e., they either store the value zero, or a constant non-zero value during their lifetime, then it is an indication that a large number of pointer-valued heap locations store NULL or a constant non-NULL value as well. This yields a stable points-to relationship. Because the edges of the heap-graph are determined by the points-to relationship between heap objects, this translates to the stability of connectivity- and degree-based metrics.

Figure 3:
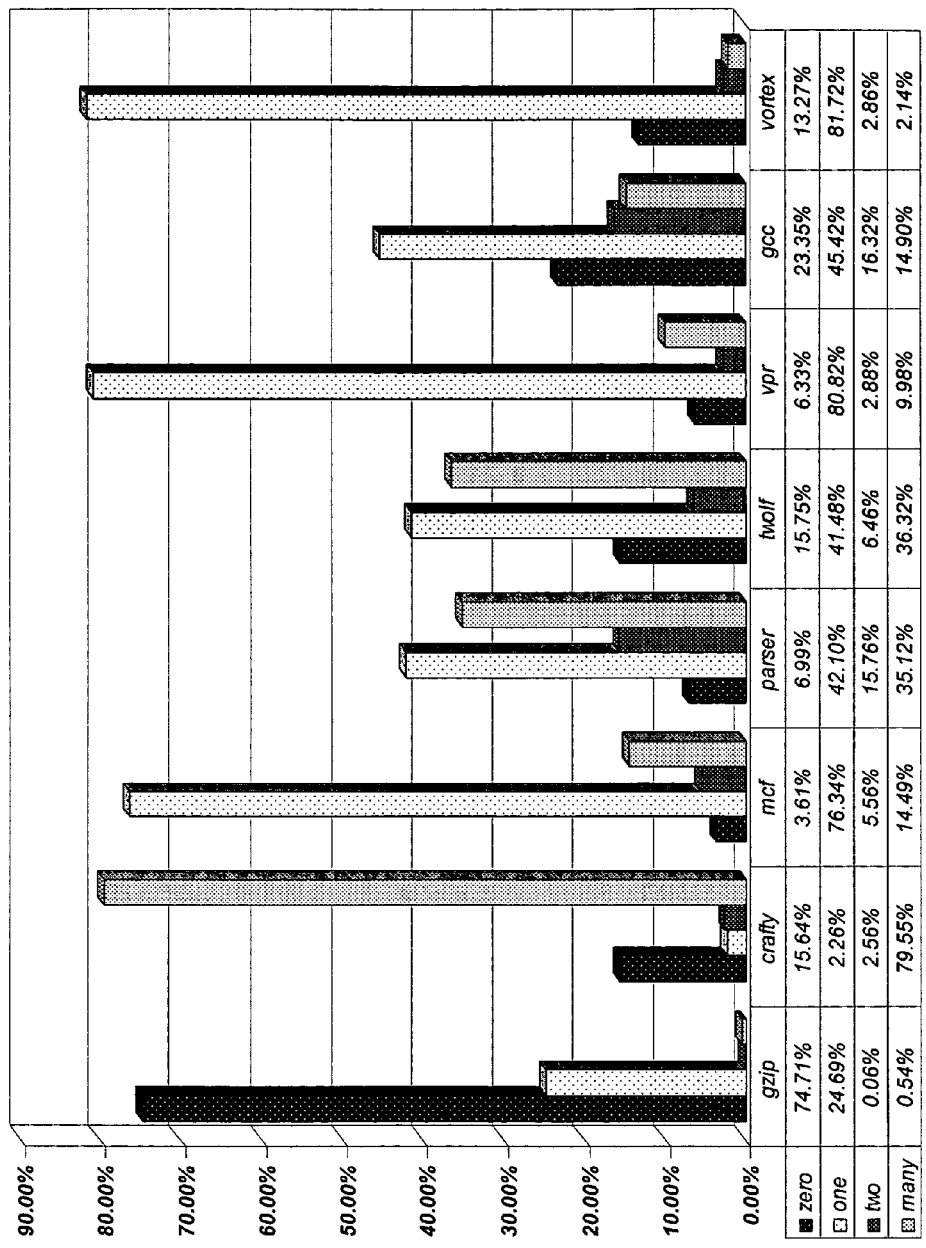
FIG. 3 is a bar chart of experimental results illustrating stability of all heap locations for a set of benchmark programs.

FIG. 3 shows the results of the study performed on eight programs chosen from the SPEC 2000 benchmarks suite. We measured the ratio of heap locations that, during their lifetime, store: (i) only the value zero, (ii) a constant nonzero value (denoted by One), (iii) exactly two non-zero values (denoted by Two), and (iv) more than two non-zero values (denoted by Many). Because heap locations are written to as the program executes, these ratios change as the program evolves. Hence, we measured the above ratios at each metric computation point—the numbers in FIG. 3 denote the average taken across all metric computation points.

Note that for all benchmarks, except crafty and parser, greater than 50% of all heap locations either store zero or a constant nonzero value. In the case of crafty, a chess playing program, all the data structures are allocated at the beginning of execution, and the program only manipulates non-pointer fields of the data structures during execution. Consequently, only 17.90% of heap locations are mutated just once.

Figure 4:
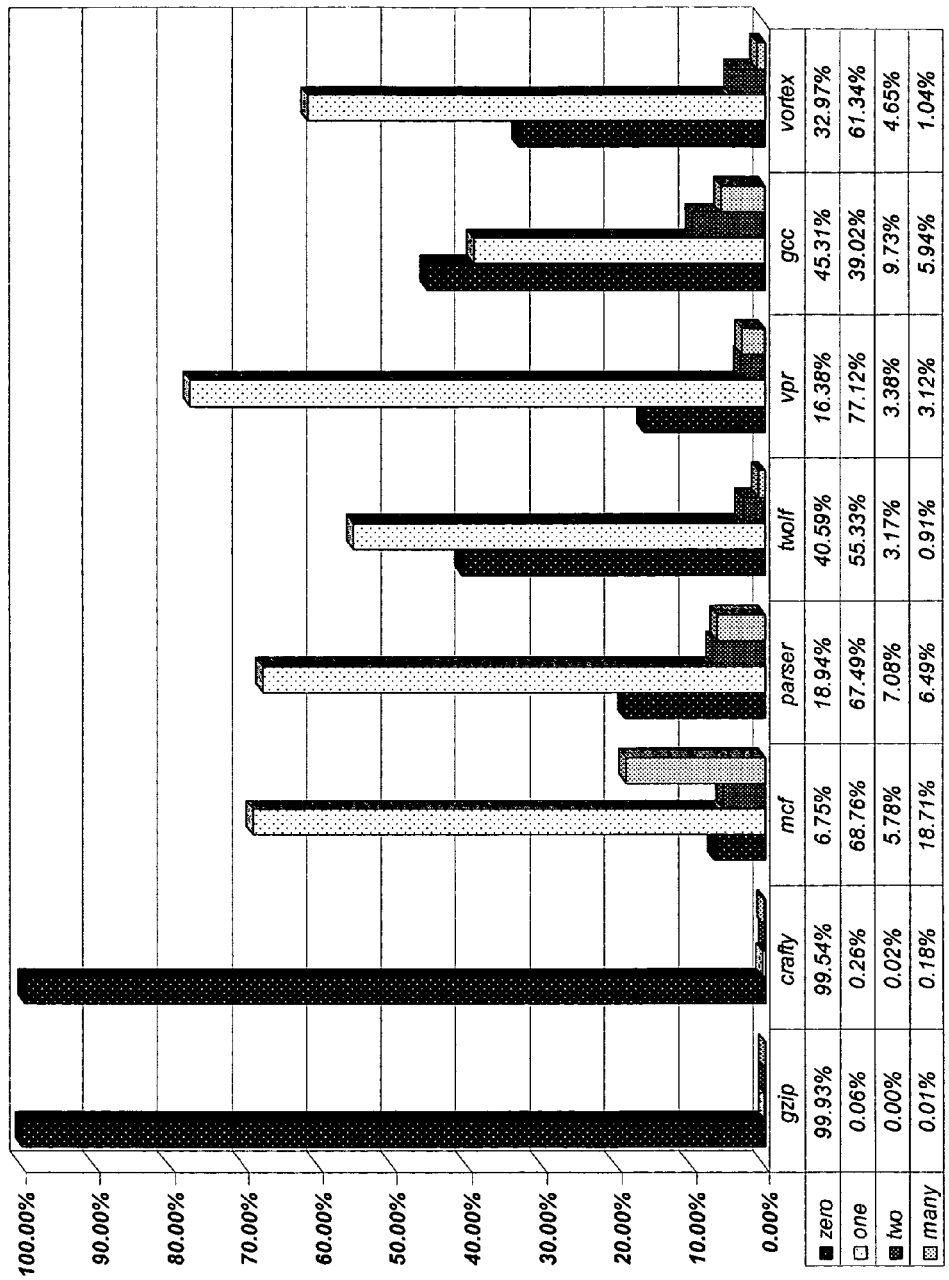
FIG. 4 is a bar chart of experimental results illustrating stability of pointer-valued heap locations for the set of benchmark programs.

While this study indicates that for most benchmarks, a majority of heap locations are mutated only once, the results are not encouraging enough to indicate the stability of connectivity- and degree-based metrics. Consequently, we performed the same experiment, but restricted attention to pointer-valued heap locations. The results, shown in FIG. 4, are very encouraging. They indicate that on an average, over 75% of pointer-valued heap locations either store NULL or a constant non-NULL value. The result is most striking in the case of crafty, where the number of pointer valued heap locations mutated only once is 99.80%, as opposed to 17.90% when all heap locations are considered.

While FIG. 4 shows the ratios averaged across all metric computation points, it does not show how these ratios evolve as the program executes. To do so, we measured the rate at which the ratio of pointer-valued heap locations that store NULL and constant non-NULL values change as the program evolves. That is, if NULLt and ONEt denote the ratio of pointer-valued heap locations that store NULL and a constant non-NULL value at metric computation point t, and NULLt+1 and ONEt+1 denote these values at computation point t+1, then, at metric computation point t+1, we record the value (NULLt+1-NULLt+ONEt+1-ONEt) NULLt+ONEt× 100. The results, presented in FIG. 5, show for each benchmark the rate of change averaged over all metric computation points, and the standard deviation of change. Note that, except for mcf, the number of heap locations that store NULL or constant values either remains a constant, or changes very slowly, as shown by the small values of standard deviation.

From this study, we conclude that the points-to relationship is relatively stable. Consequently, this indicates the stability of connectivity and degree-based metrics. Furthermore, because the points-to relationship evolves slowly over time, we can expect value-based metrics to be relatively stable as well. The results of this study also facilitate several optimization opportunities. Because a large fraction of heap locations are stable, it means they can be prefetched to the cache, thus reducing the number of cache misses.

3. Experience with the Analysis Tool

The following sections present various examples using the analysis tool 100 to identify bugs introduced into various of the SPECINT 200 benchmark programs, which illustrates key features of the analysis tool.

3.1 Detailed Example

Figure 6:
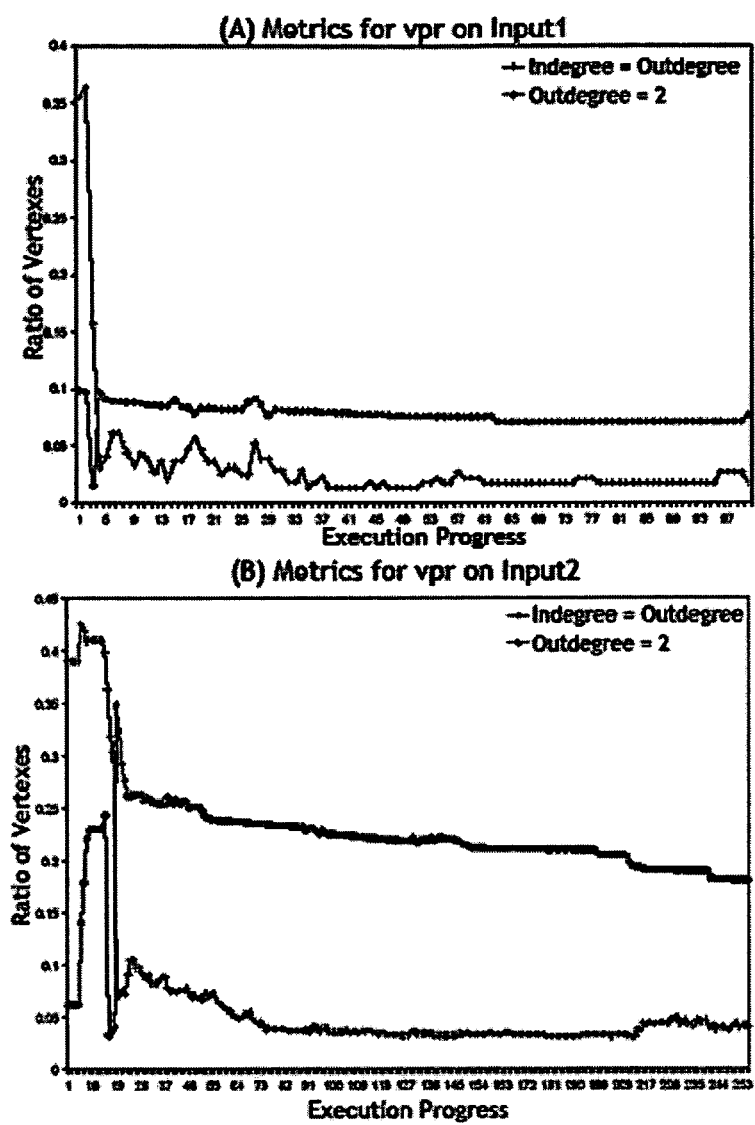
FIG. 6 is a pair of graphs of two degree-based metrics resulting from two inputs applied on a benchmark program.

Model Construction. In a first example, the analysis tool 100 (FIG. 1) produces a model of the heap behavior of the benchmark program, vpr, using the test and train input sets (henceforth referred to as Input1 and as Input2) from the SPECINT 2000 benchmark suite. The model constructor's execution logger 140 produces metric reports 145 for the execution of the vpr program on each of these inputs. For clarity, we restrict the discussion here to two degree-based metrics: the ratio of vertexes with indegree=outdegree and outdegree=2. FIGS. 6(A) and (B) denote the distribution of these metrics on Input1 and Input2, respectively. The y-axis denotes the ratio of vertexes with indegree=outdegree or outdegree=2, and the x-axis denotes progress of execution; each data point on the graph is obtained at a metric computation point. Because the vpr program executes longer on Input2, FIG. 6(B) has more metric computation points than FIG. 6(A).

Figure 7:
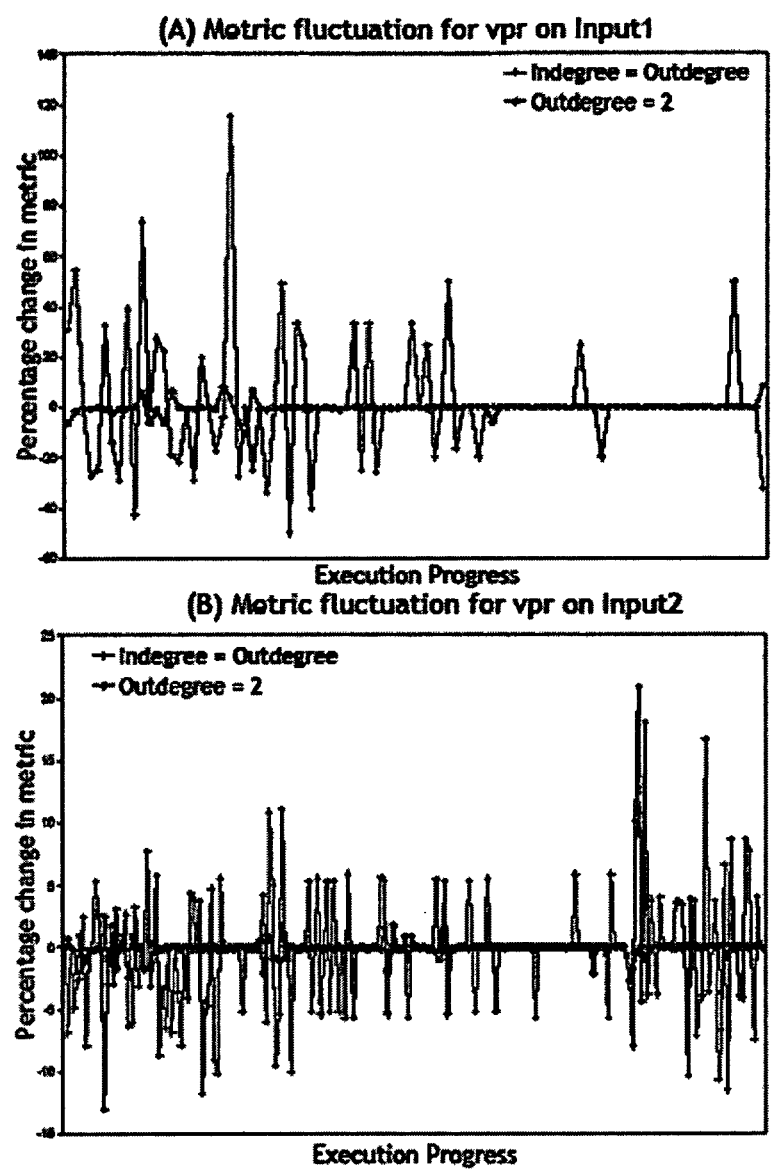
FIG. 7 is a pair of graphs of the fluctuation of the metrics shown in FIG. 6.

Note that both metrics change rapidly initially, corresponding to the heap behavior of the vpr program on startup, but stabilize as execution proceeds. Observe that for Input1, both metrics acquire a relatively stable value after 3 metric computation points, while for Input2, they do so after 25 metric computation points. As explained earlier, the metric summarizer 150 (FIG. 1) analyzes metric reports 145 for these execution runs to identify globally stable metrics: to do so, it computes the change in metrics as execution proceeds. FIGS. 7(A) and 7(B) illustrate the fluctuation of metrics as execution proceeds. The y-axis denotes the percentage change between consecutive values of the metric. That is, if a metric changes from y1 to y2 between metric computation points t and t+1, we plot the value (y2−y1)×100 y1 at t+1. The x-axis denotes metric computation points; in FIGS. 7(A) and 7(B), we ignore the first 3, and first 25 metric computation points, respectively.

Informally, for a globally stable metric, the metric fluctuation plot will be relatively "flat", and close to 0. For a locally stable metric, the fluctuation plot will also be "flat" with a value close to 0, except for occasional "spikes," which denote sharp changes in the value of the metric. Formally, the average change of a globally stable metric will be close to 0, and the standard deviation of the change will also be close to 0. The average change of a locally stable metric will also be close to 0, but the standard deviation of the change will be further away from 0. An unstable metric will either have a large non-zero value for average change, or will have a large standard deviation. By using a threshold value for the average change, and the standard deviation of change, the model constructor 110 identifies globally stable metrics.

FIG. 8 shows the average values and standard deviations of the distributions in FIGS. 7(A) and 7(B). The average changes in the ratio of vertexes with outdegree=2 are −0.22% and −0.15% for Input1 and Input2, respectively, while the standard deviations of change are 2.44% and 0.63% for Input1 and Input2, respectively. Setting the threshold for average change at ±1% and standard deviation of change at 5%, outdegree=2 becomes a globally stable metric. The allowed range of this metric is [0.071, 0.264], which are the minimum and maximum values of this metric from FIG. 6, ignoring the first 3 and first 25 metric computation points for Input1 and Input2, respectively. The ratio of vertexes with indegree=outdegree is not globally stable. For Input1 the average change is 2.10%, and the standard deviation of change is 24.38%, both of which are above the threshold. Note that for Input2, the average change and the standard deviation are within the threshold value. For a globally stable metric, we require the average change and standard deviation of change to be within the threshold for all inputs in the training set.

Checking Execution Traces. To illustrate the effectiveness of the analysis tool 100, we demonstrate how the execution checker 120 identifies bugs based upon the normal ranges of globally stable metrics identified by the model constructor 110. In this continuing example, the bug shown in the code listing of FIG. 9 was injected in the file util.c of the vpr benchmark program. In this listing, a function called "insert in vptr list" inserts a new element at the beginning of a linked list of void pointers, and returns the new head of the list. The statement at line (4) of the source code listing creates a new node, the statement on line (6) links the data-field of the node to the void pointer vptr to add, and the statement on line (7) adds the new node before the head of the linked list. To create a buggy version for this example, we removed line (6); thus a new node is added to the linked list, but the data field of the node, data vptr, is left uninitialized. As shown in FIG. 10, the dotted edges do not appear in the heap-graph of the bug-injected version of vpr. This results in a dangling pointer bug, which may lead to a crash when data vptr is dereferenced.

When this buggy version of vpr is executed on Input2, the metric outdegree=2 goes out of range. The flat lines in the graph of FIG. 11 indicate the allowed range [0.071, 0.264] for this metric, and the ratio of nodes with outdegree=2 is smaller than the minimum allowed value. In the buggy version of vpr, each node in the linked list manipulated by the "insert in vptr list" function has outdegree=1, whereas in the normal version, each node has outdegree=2. Thus, the ratio of nodes with outdegree=2 falls below the acceptable limit; predictably, the ratio of nodes with outdegree=1 was above its acceptable limit. The table in FIG. 12 also lists the normal ranges of other globally stable metrics identified by the analysis tool 100, and indicates whether the metric was out of range for the buggy version of the benchmark program, vpr. In addition to these metrics, the analysis tool identified that all the value-based metrics were stable, but were within their normal range in the buggy version.

This example illustrates the analysis tool identifies the root-cause of the bug. It identifies the bug at the point when data vptr was left uninitialized, not when a dereference of data vptr causes a crash. Thus, the analysis tool can be used effectively as a debugging tool. This example also illustrates the kind of bugs that the analysis tool was designed to isolate. In particular, the analysis tool looks for coarse-grained heap-based bugs which cause a significant change in the properties of the heap-graph, resulting in one of the globally stable metrics going out of range. Because the analysis tool does not capture invariants about a particular object or set of objects on the heap, it cannot detect fine-grained heap manipulation errors. For instance, suppose that an object "u" points to an object "v" on all the inputs from the training set. While this is an invariant which can be used for bug detection, the analysis tool does not capture this fact, and hence will not detect violation of this invariant. Similarly, shape analysis algorithms (such as the one described by M. Sagiv, T. W. Reps, and R. Wilhelm, "Parametric Shape Analysis Via 3-Valued Logic," *ACM Trans. Prog. Lang. Syst.* (*TOPLAS*), 24(3):217-298, May 2002) can prove the correctness of algorithms that manipulate data structures on the heap. They use fine-grained abstractions to capture the possible set of heap configurations at every step of the algorithm. Because the exemplary implementation of the analysis tool 100 only observes the heap-graph periodically, it cannot be used to prove or disprove the correctness of such algorithms.

3.2 More Examples

In a second example, the analysis tool 100 (FIG. 1) is used on the benchmark program, "Twolf," which is an engineering application for pin placement and routing. For this example, a bug is injected in the "sortpin" function in the source file ("sortpin.c") of the Twolf program, which is shown in the statement at line (7) of FIG. 13. The sortpin function creates and manipulates a linked list whose nodes have type "TEBOXPTR," which has, apart from other fields, two pointers: nextterm and termptr. As FIG. 14 shows, the dotted lines do not appear on the heap-graph in the bug-injected version.

The analysis tool 100 successfully finds the root cause of the bug. Among the globally stable metrics identified, outdegree=1 was above its normal range, and outdegree=2 was below the normal range, as shown in the metrics graph in FIG. 14 and summarized in the table in FIG. 16. This is as expected, because the nodes of type TEBOXPTR have outdegree=1 (instead of 2) in the buggy version. We observed that in the case of twolf, the other degree-based metrics were locally stable—they acquired different (constant) values in phases. Because the current implementation of the analysis tool 100 only supports globally stable metrics, we were unable to use locally stable metrics for bug detection.

In a further example, the analysis tool 100 was tested on another benchmark program, "Vortex," which is an object-oriented database. For this example, Vortex was modified with two injected bugs, as discussed below.

Bug 1. FIG. 17 shows the bug injected in function "Tree AddInto," a tree manipulation function in the source file, "tree00.c," of the "Vortex" program. In this procedure, a sibling is created for a leaf node in the tree; but the injected bug fails to initialize the ParentNode pointer of the sibling. As a result, the dotted edge shown in FIG. 18 is missing from the buggy version.

FIG. 21 lists the globally stable metrics identified by the analysis tool along with their normal ranges. The Ptr One metric denotes the ratio of pointer-valued heap locations that store a constant non-NULL value during their lifetime, while One is the same ratio across all heap locations, irrespective of type. The buggy version results in a greater number of nodes with indegree=1 (the parent nodes), and a fewer number of nodes with outdegree=1 (the sibling nodes), thus resulting in these metrics violating their normal ranges.

Bug 2. FIG. 19 shows the second bug, which is injected in the function "Tree PromoteInternalNode" in the source file "tree00.c" of the "Vortex" program. The arrays "NodeKeys," "NodeHandles" and "NodeLeafs" store integers. When the bug shown in line (4) of the code listing in FIG. 19 is introduced, one fewer element is updated than in the normal case.

As summarized in FIG. 21, the exemplary implementation of the analysis tool 100 is unable to identify this bug, thus resulting in a false negative. Note that because the arrays store integer values, the bug does not change the structure of the heap-graph in FIG. 20, as a result of which connectivity- and degree-based metrics are unaffected. For the same reason, Ptr One is also unaffected, because it is restricted to pointer-valued heap locations alone. However, contrary to our expectation, the metric One is also unaffected. We discovered that the reason for this is because each location of each array is updated several times, even in the correct version of vortex. Because value-based metrics group heap locations that store more than two distinct values into the same category (Many), there is no change in any of the value-based metrics when the bug is induced.

4. Alternative Implementations

Due to lack of a diagnostic front-end, it can be difficult to correlate anomalies in bug reports with the code that caused the anomaly with the above-described exemplary implementation of the analysis tool. Alternative implementations of the analysis tool can overcome this limitation by recording, in addition to the value written to a heap location, the instruction that caused the write. In other alternative implementations, the analysis tool can be combined with other diagnostic tools to better correlate a detected anomaly with the code that caused the anomaly.

Because the above-described exemplary implementation of the analysis tool instruments each instruction that writes to memory, the execution runs of the program being test may suffer performance penalty compared to uninstrumented counterparts. This is acceptable for a post-mortem analysis tool. In alternative implementations of the analysis tool as an online tool, the binary instrumenter 130 can introduce instrumentation that employs a sampling-based approach. Such periodic sampling can mitigate the cost of analysis, while still providing useful information.

Alternative implementations of the analysis tool can be modified to make use of type information, such as symbol-table information, which can be used to extract fine-grained characteristics of the heap-graph. For instance, such alternative implementation of the analysis tool could restrict attention to data members of a particular type, and only compute metrics over these data members.

4. Computing Environment

The above described exemplary analysis tool 100 (FIG. 1) that implements the above-described techniques for heap-based bug identification using anomaly detection can be implemented on any of a variety of computing devices and environments, including computers of various form factors (personal, workstation, server, handheld, laptop, tablet, or other mobile), distributed computing networks, and Web services, as a few general examples. The heap-based bug identification using anomaly detection techniques of the analysis tool 100 can be implemented in hardware circuitry, as well as in software 2280 executing within a computer or other computing environment, such as shown in FIG. 22.

Figure 22:
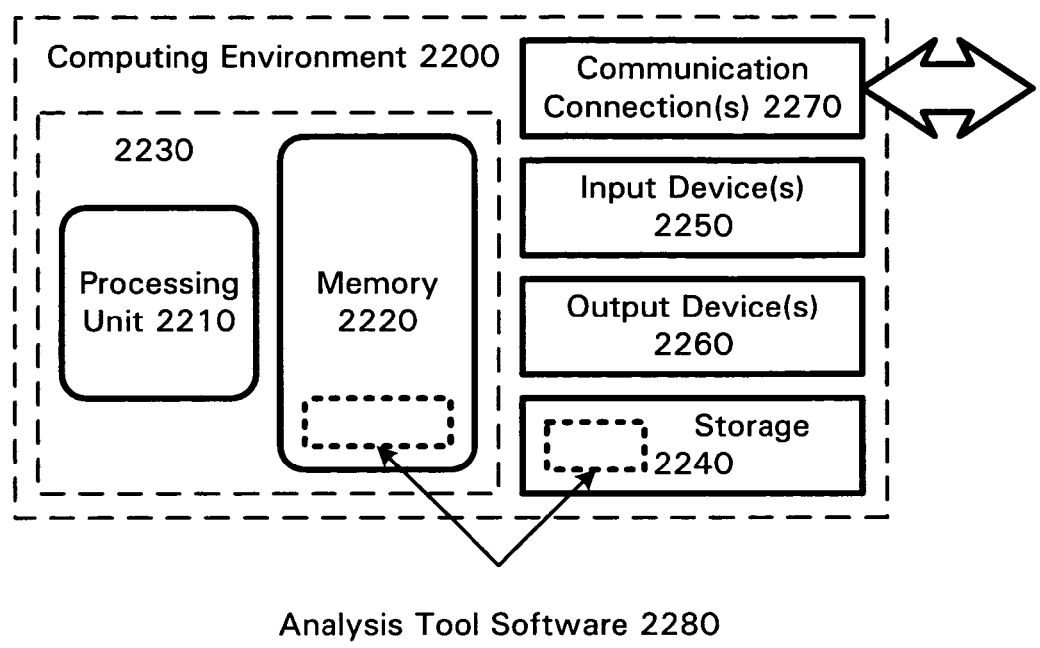
FIG. 22 is a block diagram of a suitable computing environment for implementing the software analysis tool utilizing anomaly detection to identify heap-based bugs of FIG. 1.

FIG. 22 illustrates a generalized example of a suitable computing environment 2200 in which the described techniques can be implemented. The computing environment 2200 is not intended to suggest any limitation as to scope of use or functionality of the invention, as the present invention may be implemented in diverse general-purpose or special-purpose computing environments.

With reference to FIG. 22, the computing environment 2200 includes at least one processing unit 2210 and memory 2220. In FIG. 22, this most basic configuration 2230 is included within a dashed line. The processing unit 2210 executes computer-executable instructions and may be a real or a virtual processor. In a multi-processing system, multiple processing units execute computer-executable instructions to increase processing power. The memory 2220 may be volatile memory (e.g., registers, cache, RAM), non-volatile memory (e.g., ROM, EEPROM, flash memory, etc.), or some combination of the two. The memory 2220 stores software 2280 implementing the analysis tool 100 with heap-based bug identification using anomaly detection.

A computing environment may have additional features. For example, the computing environment 2200 includes storage 2240, one or more input devices 2250, one or more output devices 2260, and one or more communication connections 2270. An interconnection mechanism (not shown) such as a bus, controller, or network interconnects the components of the computing environment 2200. Typically, operating system software (not shown) provides an operating environment for other software executing in the computing environment 2200, and coordinates activities of the components of the computing environment 2200.

The storage 2240 may be removable or non-removable, and includes magnetic disks, magnetic tapes or cassettes, CD-ROMs, CD-RWs, DVDs, or any other medium which can be used to store information and which can be accessed within the computing environment 2200. The storage 2240 stores instructions for the software 2280 of the exemplary analysis tool implementing the heap-based bug identification using anomaly detection techniques.

The input device(s) 2250 (e.g., for devices operating as a control point in the device connectivity architecture 100) may be a touch input device such as a keyboard, mouse, pen, or trackball, a voice input device, a scanning device, or another device that provides input to the computing environment 2200. For audio, the input device(s) 2250 may be a sound card or similar device that accepts audio input in analog or digital form, or a CD-ROM reader that provides audio samples to the computing environment. The output device(s) 2260 may be a display, printer, speaker, CD-writer, or another device that provides output from the computing environment 2200.

The communication connection(s) 2270 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The analysis tool and techniques herein can be described in the general context of computer-readable media. Computer-readable media are any available media that can be accessed within a computing environment. By way of example, and not limitation, with the computing environment 2200, computer-readable media include memory 2220, storage 2240, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of identifying heap-based bugs, comprising:
    building a model of heap behavior for a program executing on a computer comprising physical memory devices such that at least some memory storage for the program on the memory devices is managed as a heap, the building occurring by observing heap behavior of the program during execution, the model comprising a suite of numerical metrics, the numerical metrics measuring structure of a heap-graph which represents objects and pointers between objects in the heap;
    calculating a rate of change of the numerical metrics across one or more execution runs and comparing the rate of change to a threshold rate;
    identifying slowly-changing numerical metrics from the suite whose rate of change remains lower than the threshold rate to be globally stable;
    detecting anomalous heap behavior deviating from the model, wherein the detecting comprises computing the globally stable metrics from a subsequent execution of the program and detecting anomalies where the globally stable metrics deviate from predefined acceptable ranges, wherein the detecting ignores startup and shutdown of the program; and
    reporting information of the anomalous heap behavior as indicative of a heap-based bug in the program.

2. The method of claim 1 further comprising:
    adaptively building the model and detecting anomalous heap behavior concurrently during a single execution of the program.

3. The method of claim 1 further comprising:
    performing said detecting anomalous behavior in on-line fashion during execution of the program.

4. The method of claim 1 wherein detecting anomalous behavior comprises:
    recording an execution trace of the program's execution; and
    performing said detecting anomalous behavior in an off-line fashion based on the execution trace.

5. The method of claim 1 wherein said building the model comprises:
    causing the program to execute on a training set of inputs;
    computing the suite of numerical metrics for the heap-graph, the numerical metrics representing the program's heap behavior; and
    determining which of the numerical metrics remain stable.

6. The method of claim 5 further wherein the suite of metrics comprise at least one connectivity-based numerical metric for the heap-graph.

7. The method of claim 5 further wherein the suite of metrics comprise at least one degree-based numerical metric for the heap-graph.

8. The method of claim 5 further wherein the suite of metrics comprise at least one value-based numerical metric for the heap-graph.

9. The method of claim 5 further comprising determining numerical ranges in which the metrics for the heap-graph remain stable.

10. The method of claim 9 wherein said detecting anomalous behavior comprises:
  periodically computing the metrics for the heap-graph during a further execution of the program; and
  detecting that the metrics have gone outside of the determined ranges.

11. The method of claim 5 further comprising determining which of the metrics for the heap-graph are locally stable.

12. A computer system programmed as a dynamic analysis tool for identifying heap-based bugs in programs, comprising:
  a processor;
  memory devices, the memory devices containing memory storage for a program executing on the processor, the memory storage managed as a heap;
  the processor configured to perform:
    detecting phases of execution of the program;
    building a model of heap behavior for the program, the model comprising a set of numerical metrics, the numerical metrics measuring properties of a heap-graph which represents objects and pointers between objects in the heap and which is modified as the heap changes;
    calculating a rate of change of the numerical metrics across one or more execution runs and comparing the rate of change to a threshold rate;
    identifying slowly-changing numerical metrics from the set whose rate of change remains lower than the threshold rate within a detected phase of execution to be locally stable; and
    detecting anomalies occurring in an execution of the program in which heap behavior of the program deviates from the model wherein the detecting comprises computing the locally stable metrics from a subsequent execution of the program and detecting anomalies where the locally stable metrics deviate from predefined acceptable ranges, wherein the detecting ignores startup and shutdown of the program; and
  reporting information of the anomalies as indicative of a heap-based bug in the program.

13. The computer system of claim 12 wherein building a model comprises:
  adding instrumentation to a program to produce data representative heap usage of the program; and
  executing the program for a training set of inputs, and analyzing the data thereby produced by the instrumentation to identify a set of stable, heap-related metrics.

14. The computer system of claim 13 wherein executing the program comprises:
  adaptively modifying the heap-graph tracking heap usage of the program during execution of the training set, and periodically computing the set of numerical metrics based on the heap-graph; and
  identifying which of the numerical metrics remain stable.

15. The computer system of claim 13 wherein the set of metrics for the heap-graph comprise connectivity-based, degree-based and value-based metrics.

16. The computer system of claim 13 wherein detecting anomalies occurring in the execution of the program comprises:
  computing the set of numerical metrics for the heap-graph for an execution of the instrumented program; and
  detecting anomalies in the stable, heap-related metrics.

17. The computer system of claim 16, wherein the processor is further configured to perform:
  based on the phases detected, identify identifying metrics for the heap-graph that remain locally stable for at least one of the phases; and
  detecting anomalies in the locally stable, metrics for the heap-graph occurring in their respective locally stable phases.

18. A set of one or more computer-readable software-storing media having computer-executable instructions of a dynamic program analysis tool stored thereon, the computer-executable instructions causing a computer to perform:
  computing a suite of numerical heap-related metrics from one or more execution runs of a program on a training set of inputs, the program executing on a computer comprising physical memory devices such that at least some memory storage for the program on the memory devices is managed as a heap, and the numerical heap-related metrics measure structure of a heap-graph which represents pointers between objects in the heap during the one or more execution runs;
  recording an instruction that causes a write to a location of the heap;
  calculating a rate of change of the heap-related metrics across the one or more execution runs;
  comparing the rate of change to a threshold rate;
  identifying phases in the program;
  identifying slowly changing heap-related metrics from the suite whose rate of change remains lower than the threshold rate to be globally stable or locally stable metrics, wherein the identifying ignores startup and shutdown of the program for purposes of evaluating globally stable metrics;
  establishing ranges of the globally stable or locally stable metrics;
  computing the globally stable or locally stable metrics from a subsequent execution of the program, wherein the computing restricts attention to data members of a particular type; and
  detecting anomalies where the globally stable or locally stable metrics deviate from their respective ranges.

19. The set of one or more computer-readable software-storing media of claim 18 wherein the computer-executable instructions further comprise computer-executable instructions causing the computer to perform:
  correlating the detected anomalies with an instruction in the program that caused a respective anomaly.

20. The set of one or more computer-readable software-storing media of claim 18 wherein the numerical heap-related metrics comprise:
  number of connected components;
  number of strongly connected components;
  ratio of edges to vertices in the heap-graph; and
  ratio of heap locations that, during their lifetime, store only a value NULL.

* * * * *

UNITED STATES PATENT AND TRADEMARK OFFICE
CERTIFICATE OF CORRECTION

PATENT NO. : 7,770,153 B2
APPLICATION NO. : 11/134812
DATED : August 3, 2010
INVENTOR(S) : Trishul Chilimbi et al.

It is certified that error appears in the above-identified patent and that said Letters Patent is hereby corrected as shown below:

In column 18, line 6, in Claim 17, before "identifying" delete "identify".

Signed and Sealed this
Twenty-fourth Day of May, 2011

David J. Kappos
*Director of the United States Patent and Trademark Office*